(12) United States Patent
Hong et al.

(10) Patent No.: US 8,640,401 B2
(45) Date of Patent: Feb. 4, 2014

(54) PHOTOVOLTAIC PANEL MOUNTING SYSTEM

(75) Inventors: Xuwen Hong, Xiamen (CN); Xiaoming Wang, Xiamen (CN)

(73) Assignee: Kerry J Investments Pty Ltd., Victoria (AU)

( * ) Notice: Subject to any disclaimer, the term of this patent is extended or adjusted under 35 U.S.C. 154(b) by 169 days.

(21) Appl. No.: 12/993,003

(22) PCT Filed: May 15, 2009

(86) PCT No.: PCT/AU2009/000616
§ 371 (c)(1),
(2), (4) Date: Dec. 9, 2010

(87) PCT Pub. No.: WO2009/137887
PCT Pub. Date: Nov. 19, 2009

(65) Prior Publication Data
US 2011/0126881 A1    Jun. 2, 2011

(30) Foreign Application Priority Data
May 16, 2008    (CN) ...................... 2008 2 0102376 U

(51) Int. Cl.
*E04D 13/18*    (2006.01)
(52) U.S. Cl.
USPC ............... 52/173.3; 248/230.2; 403/257
(58) Field of Classification Search
USPC ............ 52/173.3, 845; 248/226.1, 228.6, 248/231.71, 230.1, 230.2; 403/331, 381, 403/256, 257, 259
See application file for complete search history.

(56) References Cited

U.S. PATENT DOCUMENTS

| | | | |
|---|---|---|---|
| 5,491,943 A * | 2/1996 | Vondrejs et al. ................. | 52/239 |
| 7,260,918 B2 | 8/2007 | Liebendorfer | |
| 7,434,362 B2 | 10/2008 | Liebendorfer | |
| 8,250,829 B2 * | 8/2012 | McPheeters et al. ........... | 52/710 |
| 2008/0010915 A1 | 1/2008 | Liebendorfer | |

FOREIGN PATENT DOCUMENTS

| | | |
|---|---|---|
| CA | 2454416 | 1/2003 |
| DE | 202004006224 | 8/2004 |
| DE | 202005001469 | 5/2005 |
| DE | 102007027997 | 12/2008 |
| EP | 2003405 | 12/2008 |
| GB | 2394969 | 5/2004 |
| WO | 03007688 | 1/2003 |

\* cited by examiner

*Primary Examiner* — Jeanette E Chapman
*Assistant Examiner* — Daniel Kenny
(74) *Attorney, Agent, or Firm* — Marshall, Gerstein & Borun LLP

(57) ABSTRACT

A photovoltaic module mounting system having a rack structure, which includes a mounting rack structure having a rail (5) and two clamps (6) for holding a photovoltaic module (7) by a bolt (3) extending from a press plate (4) on an outer side of the module (7) to one of the clamps (6) mounted in an upper input space (51A) in the rail (5). Entrances (50A and 50B) are provided relatively for each of the two input spaces (51A and 51B) each providing a space to input one of the at least two clamps (6), which are mutual perpendicular. The longitudinal input space (51A) in the upper section of the substantially H shape rail is used to hold the clamp (6) to fix the photovoltaic module (7). The lateral input space (51B) is used to hold the clamp (6) to fix the rail (5) to the pre-location. It has an excellent function on lateral and longitudinal location. And the structure is simple, compact, efficient, adaptable and saves on material.

10 Claims, 7 Drawing Sheets

PRIOR ART

PRIOR ART

US 8,640,401 B2

PHOTOVOLTAIC PANEL MOUNTING SYSTEM

TECHNICAL FIELD

This patent relates to a mounting system, for mounting a photovoltaic module. It is particularly used for outdoor mounting installation of photovoltaic modules.

BACKGROUND TECHNOLOGY

Solar energy is applied in all kinds of fields and plays a wide role in people's daily life, particularly with the development of science and technology as well as the growth of people's environmental consciousness. Solar water heater, solar energy car, solar energy yacht and solar energy bicycle have been coming into more common use gradually, especially solar water heater which has already been used widely.

Photovoltaic modules (PV modules) or "solar panels" are the core part of a solar generated electricity system. It undertakes the process of transforming solar radiant energy into electricity, which is then stored in a solar cell or battery or directly used in relevant work. Therefore photovoltaic modules (PV modules) or "solar panels" must be installed outdoors, such as on roofs, where they can receive sufficient radiant energy from the sun. Photovoltaic modules are usually flat and with large surface area in order to obtain more radiant energy. However such a shape and size makes them more affected by wind, so the installation fixture must have strong location capacity and structure strength.

USA patent US2006/0156651 discloses a mounting system consisting of aluminum profiles (1, 11) in which threaded sliding blocks (14) inserted in the profiles are used, in particular, for fastening to solar modules and roof supports. The mounting system comprises at least two spaced apart profiled mounting rails (1) respectively with a support (2) limiting the profile height (7) and a connection (3) below the support (2) for the roof mounting. Threaded sliding blocks (14) are inserted in a form-fitting manner in each profiled mounting rail (1) for fastening the connection with the solar modules and the roof mounts. The profiled mounting rail has additional connecting profiles (4, 5, 6), arranged on the side or on the side and bottom, for engagement with complementary connecting profiles (8, 9, 10) of a profiled connecting rail (11). The profiled mounting rail (1) can be extended by sliding shaped pieces (13) with the profile of the profiled mounting rail (1) onto the profiled connecting rail (11).

However as shown in the Prior Art FIGS. 1 and 2 in the present document the apparatus of the US document has one kind of photovoltaic modules mounting system, which includes a rail 1 and clamp 2 which in use insert clamp 2 with screw into rail 1, then fix middle clamp 4 with clamp 2 by screw 3, then the photovoltaic modules is fixed between middle clamp 4 and rail 1. The photovoltaic modules are fixed onto rail using doubles of clamp 2, while the other side of rail 1 is fixed onto the roof or other place by clamp 2. With the "L" style clamp 2, its end without screw is designed to be an incurved hook 21, and the baffle 11 on rail 1 is formed accordingly to stop the clamp 2 on lateral orientation. The top end of baffle 11 is formed by a flange, and in cooperation with a hook 21, aims to stop clamp 2 in a longitudinal orientation. However there is substantial movement of the intricate arrangement and interconnection of L-shaped clamp and therefore not a solid and fixed positioning mounting of the photovoltaic modules.

Also it can be seen that this structure, in order to retain photovoltaic modules to fixed lateral location, requires the structure to be overcomplicated. Also the photovoltaic modules have large area and perimeter taking substantial fitting space, and the rail 1 needs to be a single length, and so wastes a lot of material and the costs rise correspondingly.

SUMMARY OF THE INVENTION

It is an object of the invention to overcome or at least ameliorate one or more of the problems of the prior art by providing a simple structured mounting system, having excellent lateral and longitudinal location.

In accordance with the invention there is provided a mounting system, for mounting a photovoltaic module, and having: a mounting rack structure including at least one rail and at least two clamps; wherein the at least one rail includes two different entrances forming two input spaces each providing a space to input one of the at least two clamps; with each side of the entrance of the input space being infolded to be a stop bar or the inner wall being shaped to include a stop wall so as to retain one of the at least two clamps within a respective input space by engagement of lateral portions of the one of the at least two clamps to the stop bar and/or the stop wall; and wherein a threaded hole is run through each of the clamps to allow receipt of a bolt to provide fixed mounting of the photovoltaic module to the rack and the rack to a supporting structure.

One side of the inner wall of the at least one input space can have a pitch surface narrowing gradually toward the entrance to the inner space so that more than one inner wall under the stop bar or stop wall could be closed fit with the clamp.

The two input spaces are mutually perpendicular to form a longitudinal input space and a lateral input space to allow for the substantially perpendicular orientation of the open entrances of the two input spaces to receive two of the at least two clamps in substantially perpendicular arrangement to each other and allow relative mounting of the photovoltaic module to the rack and the rack to a supporting structure.

The profile of at least one of the at least two clamps is in one form similar to a "z" shape having a stop block on each side formed by protruding ends of the "z" shape to engage the stop bars and/or the stop walls so as to retain one of the at least two clamps within the input space.

A sliding guide can be provided in one side of the stop block of the at least one clamp and correspondingly there is a sliding guide formed on the input space inner wall of the input space of the rail whereby the clamp is held within the input space and is slidable along the rail to the required fixing point.

Several mating surface grooves are formed on an outer side of the rail allowing for connection to the outer side of a second rail. The mating surface groove on the two rails could be connected together allowing connection of two rails relatively positioned at 180 degrees.

The invention also provides a mounting system, for mounting a photovoltaic module, including a mounting rack structure having at least one rail and at least two clamps; wherein the at least one rail includes a substantially H cross sectional structure with a front wall and a back wall and a closed base wall and two different entrances forming two input spaces each providing a space to input one of the at least two clamps; wherein the two input spaces have a top entrance and a lower front entrance through the front wall and are mutually perpendicular to form a longitudinal input space and a lateral input space with perpendicular orientation of the open entrances of the two input spaces to receive clamps in substantially perpendicular arrangement to each other; with one side of the entrance of the input space being infolded to be a stop bar and the inner wall of the other side is shaped to include a stop wall so as to retain one of the at least two clamps within the input space; and wherein a threaded hole is run through each of the clamps to allow receipt of a bolt extend and trap an outer side of a photovoltaic module and be clamped by the bolt and clamp to an upper surface of the linear rail thereby providing fixed mounting of the photovoltaic module to the rack and the rack to a supporting structure There is also provided a mounting rack structure for mounting a photovoltaic module including a substantially H cross sectional structure with a front wall and a back wall and a closed base wall and two different entrances forming two input spaces each providing a space to input one of the at least two clamps and wherein the two input spaces are mutually perpendicular to form a longitudinal input space and a lateral input space to allow for the substantially perpendicular orientation of the open entrances of the two input spaces to receive two of the at least two clamps in substantially perpendicular arrangement to each other and allow relative mounting of the photovoltaic module to the rack and the rack to a supporting structure.

The invention still further provides a method of mounting a photovoltaic module including the steps of:
a) Providing at least one elongated linear rail having consistent cross section with two inner spaces extending longitudinally and each inner space having external entrances at angle to each other;
b) Providing at least one clamp for insertion in each input space and able to receive a bolt extending through the entrance and be held by the clamp;
c) Fixing a bolt to extend and trap an outer side of a photovoltaic module and be clamped by the bolt and clamp to an upper surface of the linear rail
d) Fixing a bolt to extend and engage a supporting surface and be clamped by the bolt and clamp the rail to the supporting surface;

wherein the rail has a cross sectional shape with the mating surface grooves such that two rails can be connected together end to end by a third rail portion relatively positioned contiguously and at 180 degrees to the other two rails.

It can be seen that the invention provides two differences entrance in the rail provided the space to input the clamp. One side of the input space is infolded to be a stop bar. The inner wall of the other side is to be the stop wall. And one side of the inner wall is a pitch surface broadened gradually toward the inner. So, more than one inner wall under the stop bar could be closed fit with the clamp. A threaded hole is run through the clamp.

It is designed to be mutual perpendicular for the open orientation of the two input space.

The profile of the clamp is similar with the "z". Two stop block is formed both side. It is formed a sliding guide in the one side of the stop block of the clamp. Correspondingly, there is a sliding guide formed on the input space inner wall of the rail.

One side of above mentioned rail has several mating surface groove, which makes two rails turn 180 degrees relatively, and afterwards the rails could be clamped together.

In use, the clamp is placed into the input space of rail, fix press plate and clamped by a screw bolt, so the photovoltaic module is clipped between the press plate and the rail. Fix the photovoltaic module to the rail by the rail and several clamps around the photovoltaic module. And fix it to the roof by another input space, clamp and screw. Both sides of the clamp would be stop by the stop bar and stop block completely to locate the longitudinal orientation after fasten the screw. As the clamp close with the stop block, a close fit is formed between the inner wall of Input space and the clamp to locate the lateral orientation.

Therefore, we can get the effect of lateral and longitudinal location by forming two stop blocks on the Input space in the side. It is much simpler than the current technique (American patent US2006/0156651), then save material. Otherwise, clamp of this utility model needn't to be incurred into "L", so clamp of this model has better structure intensity when using material of same volume.

BRIEF DESCRIPTION OF THE DRAWINGS

In order that the invention is more readily understood an embodiment will be described by way of illustration only with reference to the drawings wherein.

PREFERRED EMBODIMENT OF THE INVENTION

Figure 1:
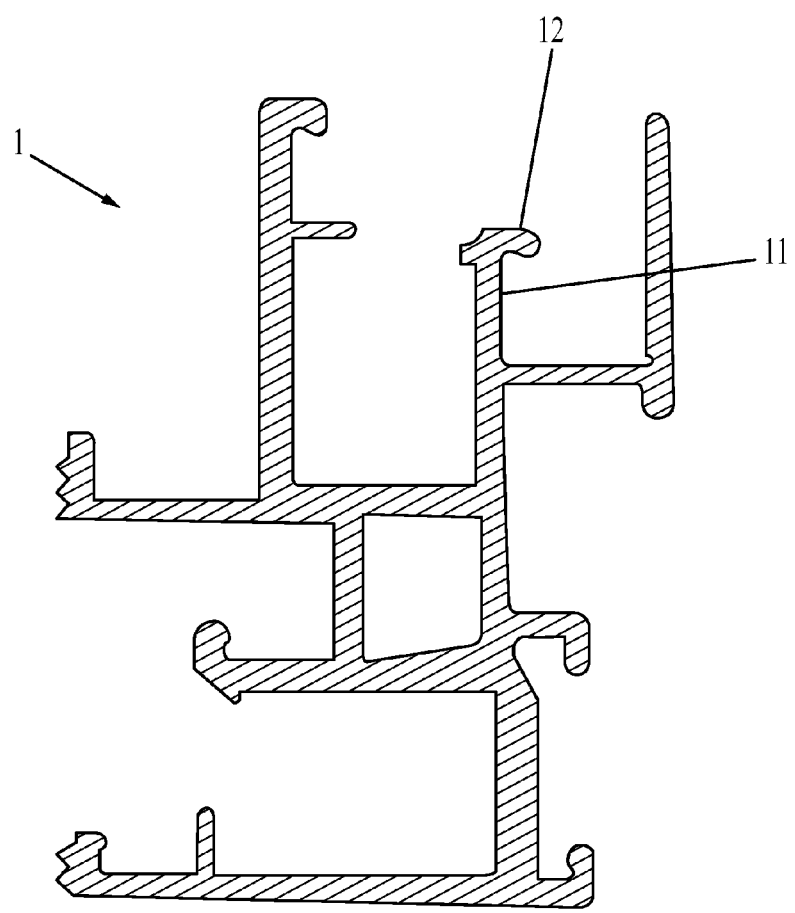
FIG. 1 is a diagrammatic view of a section of rail in prior art.
Figure 2:
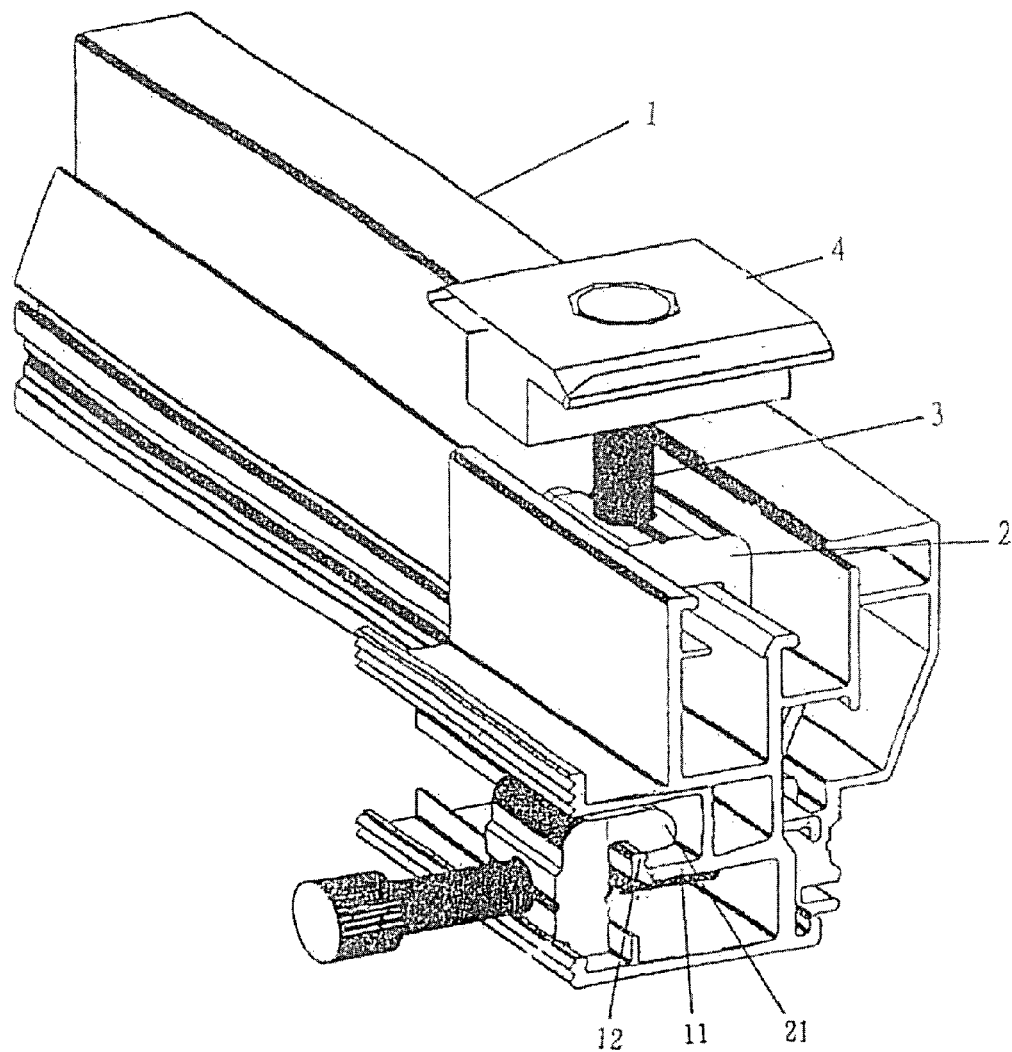
FIG. 2 is a diagrammatic view of a working state sketch of a rail structure in prior art.
Figure 3:
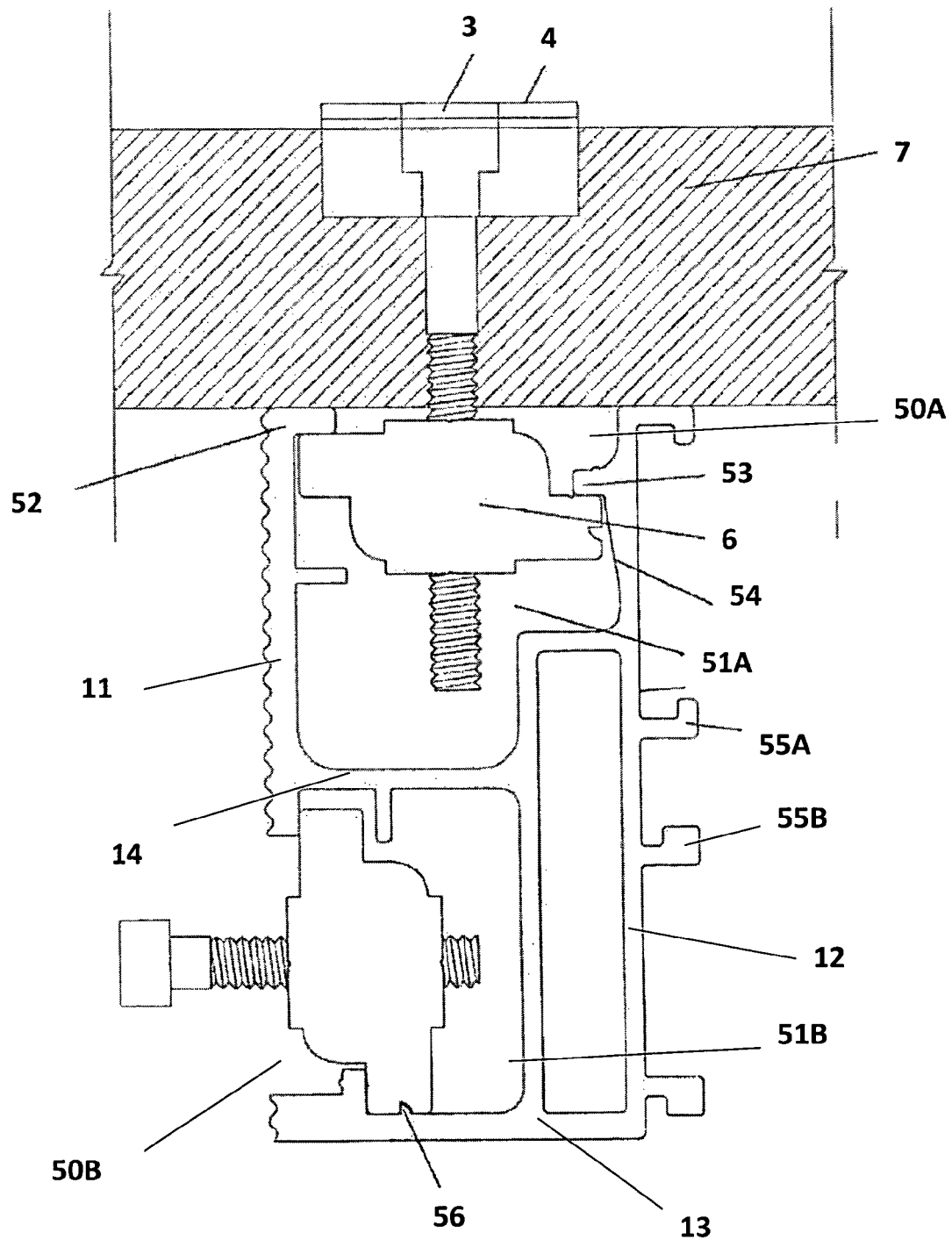
FIG. 3 is a diagrammatic sectional view a photovoltaic module mounting system in accordance with an embodiment of the invention.
Figure 4:
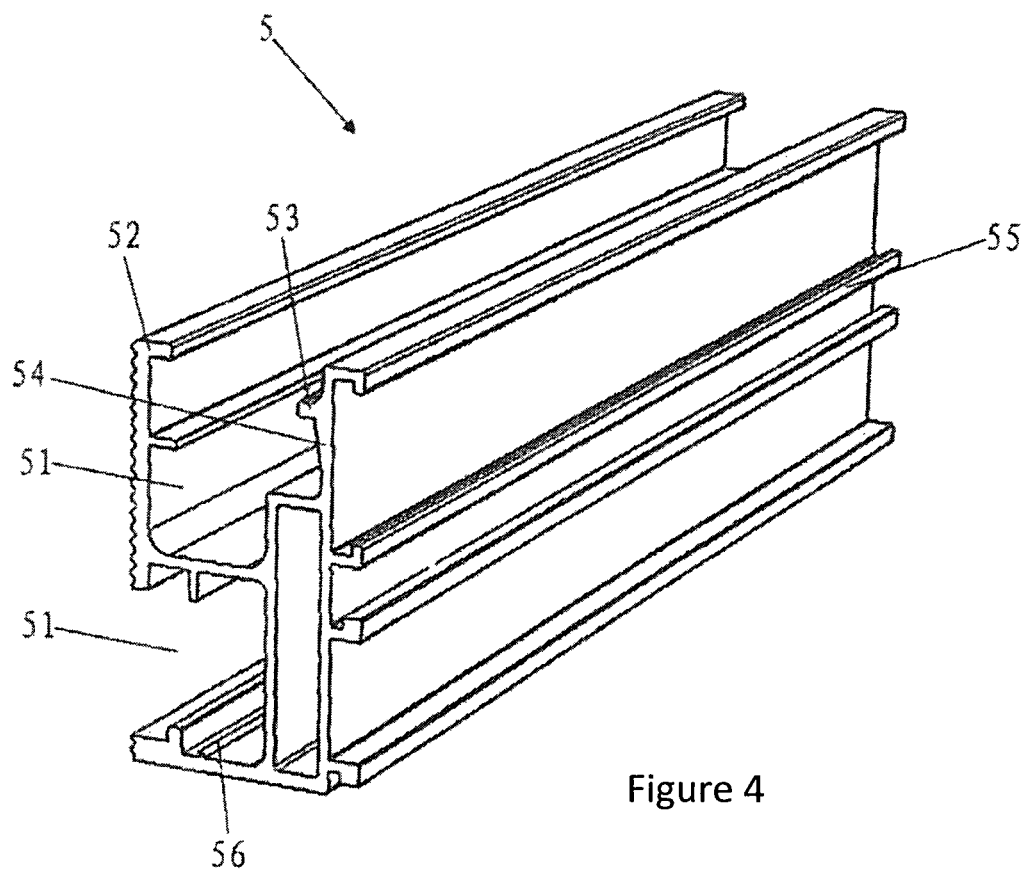
FIG. 4 is a diagrammatic view of rail structure of the photovoltaic module mounting system of FIG. 3.

An embodiment of the invention is shown in FIGS. 3 to 8. FIGS. 3 and 4 are an example of photovoltaic modules mounting system using this invention and includes a mounting rack structure a rail 5 and two clamps 6 for holding a photovoltaic module 7 by a bolt 3 extending from a press plate 4 on an outer side of the module 7 to one of the clamps 6 mounted in an upper input space 51A in the rail 5.

The rail 5 is continuous elongated rail with primarily a substantially consistent H cross sectional structure with a front wall 11, a back wall 12 and a closed base wall 13 with a cross member 14 extending substantially across a middle section between the front wall towards the back wall to define two input spaces 51A and 51B. Entrances 50A and 50B are provided relatively for each of the two input spaces 51A and 51B each providing a space to input one of the at least two clamps 6.

As shown in FIG. 4, the Rail 5 has two input spaces 51A and 51B with different orientations, which are mutual perpendicular. The longitudinal input space 51A in the upper section of the substantially H shape rail with the upper entrance 50A is used to hold the clamp 6 to fix the photovoltaic module 7. The lateral input space 51B with the lateral lower front entrance 50B is used to hold the clamp 6 to fix the rail 5 to the pre-location of the supporting structure.

Each side of the entrance 50A or 50B of the input spaces 51A and 51B are either infolded to be a stop bar or the inner wall being shaped to include a stop wall so as to retain one of the at least two clamps within a respective input space by engagement of lateral portions of the one of the at least two clamps to the stop bar and/or the stop wall. In particular the longitudinal input space 51A has one side of the input space hatch forming a stop bar 52, the other side forming a stop block 53 on the inner wall 54. The stop block 53 of the longitudinal input space, the top of the inner wall 54 towards the entrance but below the stop block 53 and the clamp 6 form a close fit. However the inner wall 54 is an inclined plane which gradually widens toward the entrance 50A.

Figure 5:
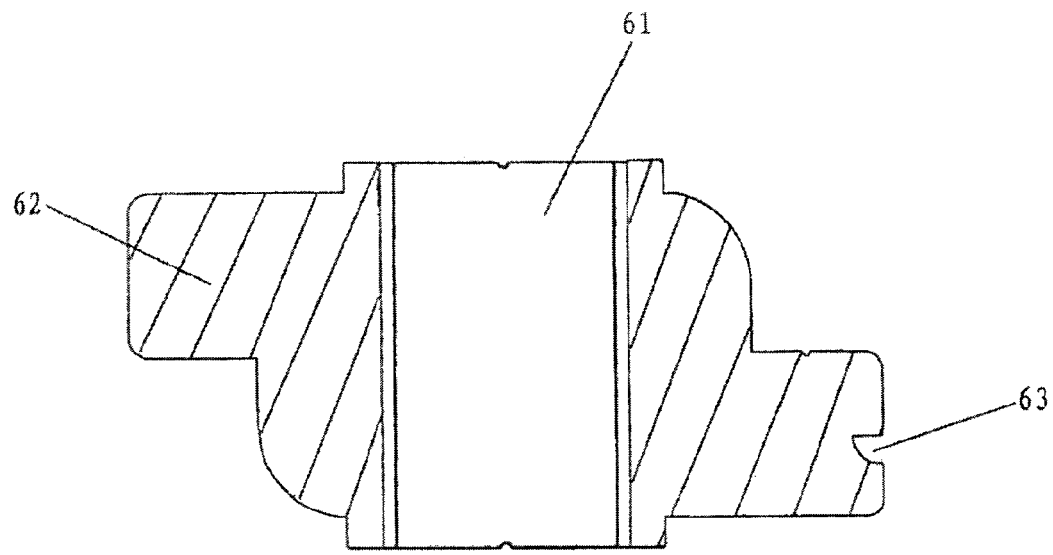
FIG. 5 is a diagrammatic sectional view of the clamp of the photovoltaic module mounting system of FIG. 3.

As shown in FIG. 5 a threaded hole is run through each of the clamps 6 to allow receipt of a bolt 3 to provide fixed mounting of the photovoltaic module 7 to the rack 5 and the rack to a supporting structure. In particular the clamp 6 has a 'Z' profile. It is formed having a stop block 62 on each side formed by protruding ends of the "z" shape. There is a threaded hole 61 throughout the clamp 6 body.

Figure 6:
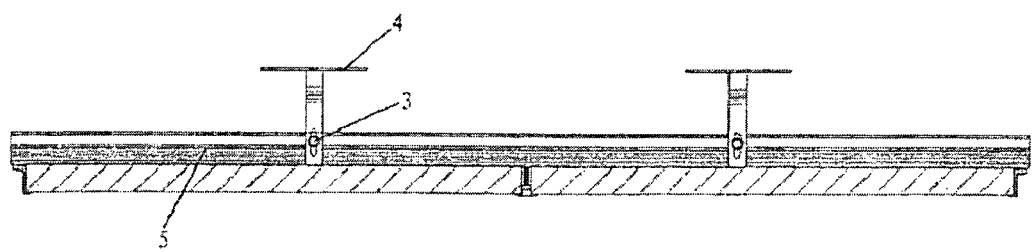
FIG. 6 is a diagrammatic side view of the of the photovoltaic module mounting system of FIG. 3.

As shown in cross section in FIG. 3 and in a diagrammatic side view in FIG. 6 when using this invention, the clamp 6 is located in the rail longitudinal input space 51A, and a spaced press plate 4 is fixed to the clamp 6 by a bolt 6. The photovoltaic module 7 would be clipped between the press plate 4 and the rail 5. It can take several clamps 6 along the rail to fix the surround of the photovoltaic module to the rail 5.

The fastening of the photovoltaic module 7 on the roof or the other places is dependent on the lateral input space 51B in the rail 5, and the clamp 6 and the bolt 3 to fix the rail 5 to the roof or the other places.

When fastening the bolt 3, the two end stop blocks 62 of the z-shaped clamp 6 would close against the stop bar 52 and stop wall 53, to form a fixed longitudinal location. When the clamp 6 is closed to the stop wall 53, the inner wall of the input space 51 would be close fitting with clamp 6 in a lateral location. Since the inner wall 54 is an inclined plane which widens gradually toward the entrance, it is easier to insert the clamp 6 into the input space 51 at the wide position.

When fixing the rail 5, due to the weight of the photovoltaic module 7 and the rail 5, it is impossible to shake in the longitudinal orientation as the location is secured. It can be seen that the close fit structure between the inner wall 54 of the lateral input space 51 and the clamp 6 do not need to have an inner wall 54 with an inclined plane.

For the lateral location of the clamp 6 in the rail 5, there is formed a location slide rail 56 on the inner wall 54 of the base wall 13 in the lateral input space 51B of the rail 5. A sliding guide 63 is formed in one side stop block of the clamp 6. The lateral location performance is strengthened by the fit between the slide rail 56 and the sliding guide 63.

Figure 7:
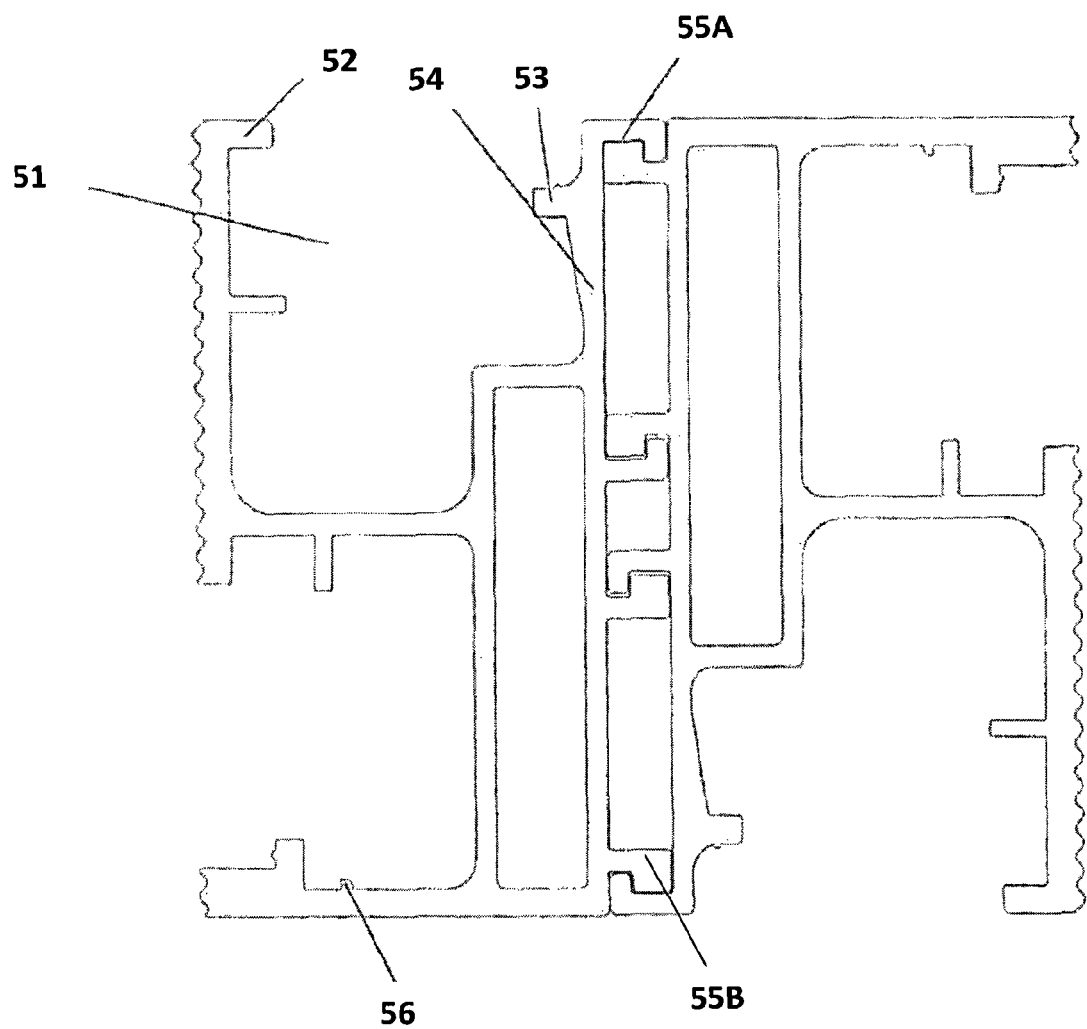
FIG. 7 is a diagrammatic sectional view of a combination of two rails joined by the out flange in a photovoltaic module mounting system of FIG. 3.
Figure 8:
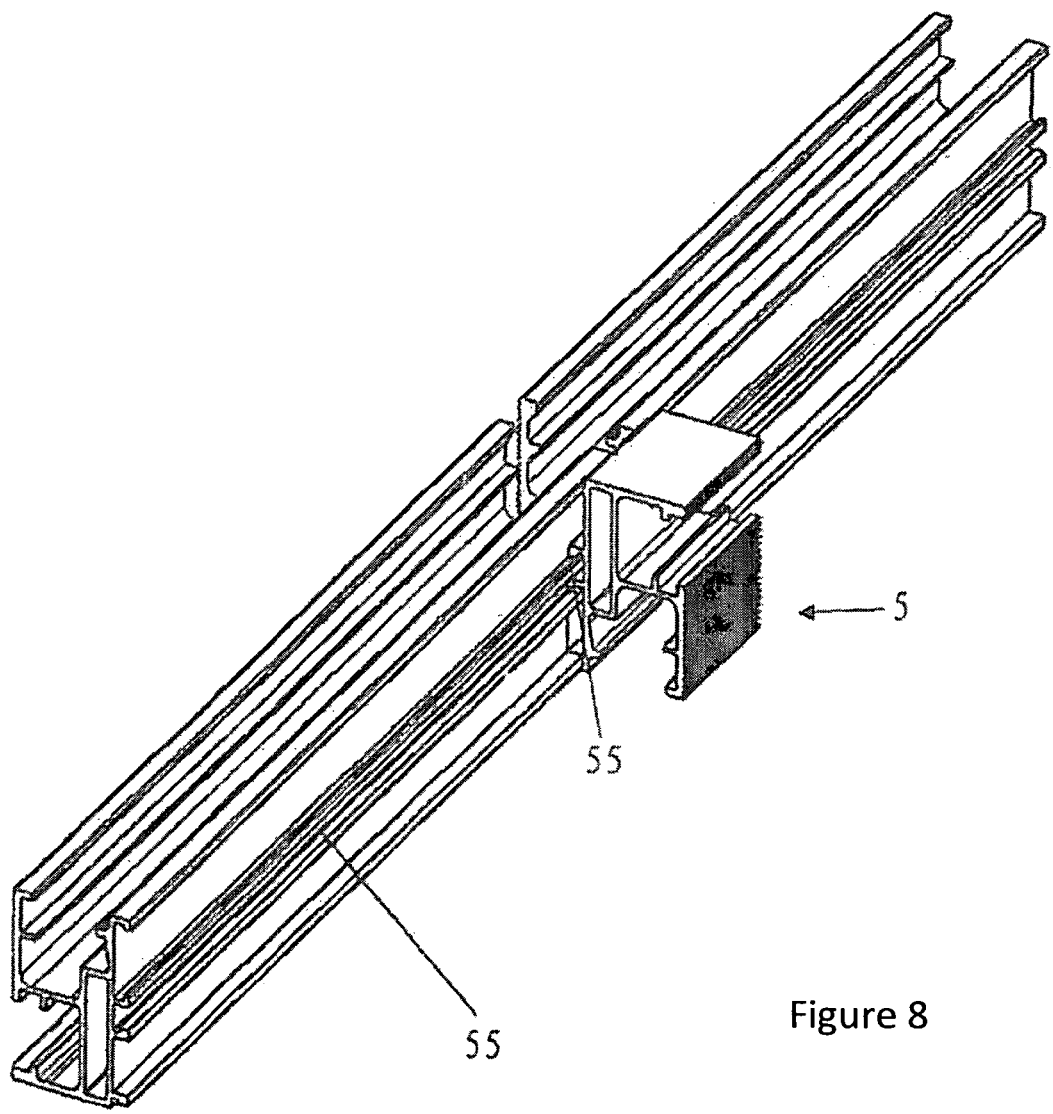
FIG. 8 is a diagrammatic perspective view of the connection between the rails by the out flange of the combination of two rails of FIG. 7.

In addition, with reference to FIG. 7, there are shown two rail portions that can be interfitted. Each rail has an outer side of the back wall 12 of the rail 5 formed with pair of inwardly extending flanges 55A on a top section and pair of inwardly extending flanges 55B on a bottom section, which can be used to engage each other after two rails are position back wall to back wall but with a relative rotation of 180 degrees. This can particularly be use to have a short section connect two end to end long sections to form a continuous rail and increase the length of the rail 5 as shown in FIG. 8.

Generally, it can be seen that the invention provides a secure mechanism for the lateral and the longitudinal location of a photovoltaic module, and it is simpler, compact, effective, adaptive and saves material than the prior art.

The invention claimed is:
1. A mounting system, for mounting a photovoltaic module, the mounting system including:
   a mounting rack structure including at least one rail and at least one clamp;
   wherein the at least one rail includes at least one entrance forming an input space providing a cavity to input the at least one clamp;
   the at least one entrance being shaped to form a stop bar on one side of the entrance and a stop wall on the other side of the entrance so as to retain the at least one clamp within the input space by engagement of lateral portions of the at least one claim respectively with the stop bar and with the stop wall;
   wherein each clamp of the at least one clamp has a threaded hole which extends through the clamp thereby to allow receipt of a bolt to provide fixed mounting of the photovoltaic module to the rack and the rack to a supporting structure;
   wherein one side of an inner wall of the input space has a pitched surface narrowing gradually toward the entrance of the input space thereby gradually reducing a cross sectional diameter of the input space towards the entrance; and
   wherein the profile of the at least one clamp is similar to a "z" shape having a stop block on each side formed by protruding ends of the "z" shape to engage respectively with the stop bar and the stop wall of the at least one entrance so as to retain the at least one "z" shaped clamp within the input space.

2. The mounting system, for mounting a photovoltaic module, according to claim 1 wherein the mounting rack structure includes at least two clamps and the at least one rail includes first and second entrances each of which forming an input space providing a cavity to input at least one of the at least two clamps;
   wherein the two input spaces are positioned perpendicularly relative to each other and each form an input space which extends longitudinally across a side of the at least one rail;
   wherein the perpendicular orientation of the entrance of the two input spaces allow, in a perpendicular manner, the photovoltaic module to be secured with one of the at least two clamps to one of the two input spaces and the at least one rail to a supporting structure with the other of the at least two clamps engaged with the other of the two input spaces.

3. The mounting system, for mounting a photovoltaic module, according to claim 2 wherein the profile of at least one of the at least two clamps is similar to a "z" shape having a stop block on each side formed by protruding ends of the "z" shape to engage respectively with the stop bar and the stop wall of a selected input space of the two input spaces so as to retain the at least one "z" shaped clamp within the selected input space.

4. The mounting system, for mounting a photovoltaic module, according to claim 3, wherein a sliding guide is formed on one side of a stop block of one of the at least two clamps; and
   wherein a sliding guide is formed on an inner wall of at least one of the two input spaces so that engagement of the sliding guides, of a selected clamp of the at least two clamps and of a selected input space of the two input spaces, guides sliding movement of the selected clamp along the rail to a fixing point.

5. The mounting system, for mounting a photovoltaic module, according to claim 1 wherein the mounting rack structure includes first and second rails; and
   wherein each of the first and second rails is formed with a number of mating surface grooves on an outer side of the rail allowing the first and second rails to be connected to each other through engagement of the mating surface grooves.

6. The mounting system, for mounting a photovoltaic module, according to claim 5 wherein the mating surface grooves allow the two rails to be connected to each other so that the first rail is rotated through an angle of 180 degrees relative to the second rail.

7. A mounting system, for mounting a photovoltaic module to a support structure, the mounting system including:
- a mounting rack structure including at least one rail which has a first end and an opposed second end and which is adapted to engage with at least two clamps;
- the at least one rail includes at least two entrances each of which extends between the first and second ends of the at least one rail and each of which leads to an input cavity which is adapted to receive at least one of the at least two clamps;
- each of the at least two input cavities is formed on a side of the at least one rail so that the at least two input cavities extend perpendicularly relative to each other into the at least one rail thereby allowing each of the at least two input cavities to receive one or more of the at least two clamps substantially in a perpendicular arrangement relative to each other so that the photovoltaic module can be mounted to the mounting rack and the mounting rack to the supporting structure at a right angle;
- wherein each of the two input cavities has a step profile to allow each of the at least two clamps to be insertable through the respective entrance of the two input cavities at any position selected along a length of the at least one rail;
- wherein the step profile of each of the at least two input cavities allows a selected clamp of the at least two clamps to be inserted at a first angle into a selected input cavity while securing the selected clamp to the selected input cavity when the clamp is pulled from the selected input cavity at a second angle which is different to the first angle;
- wherein the second angle is substantially perpendicular relative to a plane in which the entrance of the selected input cavity lies; and
- wherein the profile of the selected clamp is similar to a "z" shape having a stop block on each side formed by protruding ends of the "z" shape to engage the selected input cavity so as to retain the selected "z" shaped clamp within the selected input cavity.

8. A mounting system according to claim 7 wherein the step profile of each of the at least two input cavities includes, at one side of the input cavity, a channel formation which extends longitudinally in the input cavity between the first and second ends of the at least one rail, and at an opposed side of the input cavity a stop formation which extends longitudinally in the input cavity between the first and second ends of the at least one rail; and
- wherein the stop formation is at a position inside the each of the at least two input cavities which is offset to a position of the channel formation thereby to allow each of the at least two clamps to be insertable through the entrance of each input cavity in the first angle while securing each of the at least two clamps to each input cavity when pulled in the second angle.

9. A mounting system, for mounting a photovoltaic module, the mounting system includes:
- a mounting rack structure including at least on rail and at least two clamps;
- the at least one rail includes at least first and second entrances each of which forming an input space providing a cavity to input at least one of the at least two clamps;
- wherein the two input spaces are positioned perpendicularly relative to each other and each form an input space which extends longitudinally across a side of the at least one rail;
- wherein each of the first and second entrances being shaped to form a stop bar on one side of the entrance and a stop wall on the other side of the entrance so as to retain a selected clamp of the at least two clamps within the input space by engagement of lateral portions of the selected clamp respectively with the stop bar and with the stop wall;
- wherein the perpendicular orientation of the entrances of the two input spaces allow, in a perpendicular manner, the photovoltaic module to be secured with one of the at least two clamps to one of the two input spaces and the at least one rail to a supporting structure with the other of the at least two clamps engaged with the other of the two input spaces;
- wherein the profile of each of the at least two clamps is similar to a "z" shape having a stop block on each side formed by protruding ends of the "z" shape to engage respectively with the stop bar and the stop wall of a selected input space of the two input spaces so as to retain each of the at least two clamps within the input spaces;
- wherein a sliding guide is formed on one side of a stop block of one of the at least two clamps;
- wherein a sliding guide is formed on an inner wall of at least one of the two input spaces so that engagement of the sliding guides, of a selected clamp of the at least two clamps carrying the sliding guide and of a selected input space of the two input spaces carrying the slides guide, guides sliding movement of the selected clamp along the rail to a fixing point;
- wherein one side of the inner wall of each input space has a pitched surface narrowing gradually toward the entrance of the input space thereby gradually reducing a cross sectional diameter of the input space towards the entrance;
- wherein an angle of the pitched surface is such that a respective clamp of the at least two clamps, carrying a guide formation, is guided towards the inner wall of the input space carrying the sliding guide thereby causing engagement of the respective sliding guides.

10. A mounting system, for mounting a photovoltaic module, the mounting system including:
- a mounting rack structure including at least one rail and at least one clamp;
- wherein the at least one rail includes at least one entrance forming an input space providing a cavity to input the at least one clamp;
- the at least one entrance being shaped to form a stop bar on one side of the entrance and a stop wall on the other side of the entrance so as to retain the at least one clamp within the input space by engagement of lateral portions of the at least one claim respectively with the stop bar and with the stop wall;
- wherein each clamp of the at least one clamp has a threaded hole which extends through the clamp thereby to allow receipt of a bolt to provide fixed mounting of the photovoltaic module to the rack and the rack to a supporting structure;
- wherein one side of an inner wall of the input space has a pitched surface narrowing gradually toward the entrance of the input space thereby gradually reducing a cross sectional diameter of the input space towards the entrance;

wherein a sliding guide is formed on one side of the at least one clamp; and wherein a sliding guide is formed on one side of the inner wall of the input space so that engagement of the sliding guides, of the at least one clamp and of the input space, guides sliding movement of the at least one clamp along the rail to a fixing point.

* * * * *

UNITED STATES PATENT AND TRADEMARK OFFICE
CERTIFICATE OF CORRECTION

PATENT NO. : 8,640,401 B2  Page 1 of 1
APPLICATION NO. : 12/993003
DATED : February 4, 2014
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 193 days.

Signed and Sealed this
Twenty-second Day of September, 2015

Michelle K. Lee
*Director of the United States Patent and Trademark Office*